2,897,600
PROCESS OF DEHYDRATING BIOLOGICAL MATERIALS

Robert P. Graham and Amon H. Brown, El Cerrito, and William D. Ramage, Berkeley, Calif., assignors to the United States of America as represented by the Secretary of Agriculture No Drawing. Application August 13, 1958
Serial No. 754,904

6 Claims. (Cl. 34—5)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is granted to the Government of the United States of America.

This application is a continuation-in-part of our prior pending application Serial No. 628,205, filed Dec. 13, 1956, now Patent No. 2,853,797, issued Sept. 30, 1958.

This invention relates to and has among its objects the provision of techniques for dehydrating biological materials, particularly microbial cultures, whereby to produce solid, dry products which are capable of being stored for indefinite periods of time without loss of activity. One object of the invention is the provision of processes of the above type wherein the dehydration is accomplished without damage to the viability of the culture so that the dry product is a nondeteriorating, instantly-available source of a viable culture which will proliferate vigorously and immediately upon exposure to moist conditions and nutritive materials. A further object of the invention concerns the provision of procedures wherein the dehydration yields products which are in a porous, disperse form which can readily be reduced to a powder of extremely fine particle size without damage to the viability of the microorganism. Another object of the invention concerns the accomplishing of such techniques of dehydration in a rapid and efficient manner requiring only the use of simple and inexpensive equipment. Another object of the invention is the provision of processes of dehydration which are particularly characterized by their versatility and adaptability to various conditions of temperature and the like without loss of efficiency.

A particular object of the invention concerns the provision of imrovements over the basic dehydration process disclosed in our prior application. These improvements involve the provision of procedures whereby frozen particles undergoing dehydration are prevented from cohering to one another or to the moisture adsorbent employed in the dehydration. By preventing such coherence, uniform and rapid dehydration is ensured and contamination of the product with particles of the adsorbent is minimized. Basically, the improved results are attained by coating the frozen particles with very finely divided inert materials as explained in more detail below in the section designated "B. Coating of the Frozen Particles."

In the fields of industrial, agricultural, and experimental microbiology, it is often desired to preserve microbial cultures for extended periods of time. Maintaining such cultures on agar slants or similar media is not satisfactory because of the necessity for careful temperature control, repeated transfers to fresh media, danger of contamination and so forth. Generally, it is preferred to dehydrate the cultures so that they will be converted into dry products which are of more stable character and which will withstand storage at ordinary temperatures for long periods of time. In preparing such dry products, it is of utmost importance that the viability of the culture be maintained. Naturally, if the organism is killed in the dehydration, the process is a futility. Further, for best results, the dehydration should not impair the viability of the culture to any appreciable degree so that the dry culture will retain its full vigor and will proliferate rapidly when exposed to moist and nutritive conditions. In general the preparation of variable dry cultures from non-spore forming organisms is more difficult than the spore-formers because the nonsporulating organisms contain only vegetative tissue which is intrinsically not well adaptet to resisting unfavorable conditions.

Usually microbial cultures are dehydrated by conventional freeze-drying procedures. On an industrial scale this procedure involves filling the culture into metal trays and subjecting the filled trays to refrigeration to freeze the cultures into a solid mass. The trays are then slid onto the hollow shelves of a vacuum shelf drier. The drier is then closed and high vacuum equivalent to an absolute pressure of about 50 microns of Hg or less is applied. As the dehydration proceeds a heated medium is circulated through the hollow shelves to supply the heat needed for sublimation of moisture from the frozen culture. Thus throughout the process the culture is maintained in a frozen state but as sublimation of moisture takes place, heat must be supplied to the culture to balance the cooling effect of the sublimation. If heat were not supplied, the culture would become so cold that the sublimation of moisture would cease, for all practical purposes.

Such freeze drying techniques offer, at best, a compromise between (1) extremely slow dehydration if the viability of the product is completely maintained or (2) at least partial destruction of viability if the dehydration is operated at a reasonable rate. The reason for this dilemma is that it is impossible to transfer heat uniformly to the particles undergoing dehydration. For practical operation the culture in the dehydrator trays must have a depth on the order of one-quarter to one inch. (It is obvious that if the layer is extremely thin the dehydrator will be used at only a small fraction of its intended capacity.) During the dehydration it is necessary, as pointed out above, to apply heat to the culture to supply the heat of sublimation. This is done by circulating heated water through the hollow shelves. As a result, the bottom of the culture layer which is nearer to the heated shelf is subjected to more heat than the upper part of the culture layer. (In this regard it is to be noted that the culture is maintained in a solid, frozen state so that transfer of heat by circulating currents as would occur in heating a fluid cannot take place.) Under these conditions, the bottom portion of the culture layer is dehydrated more rapidly than the material in the upper portion and eventually becomes overheated as its moisture content decreases and its temperature is no longer kept in check by the cooling effect of sublimation. In order to dehydrate the remaining part of the culture in the upper portion of the layer, the lower material must be subjected to the excessive temperature to serve as a heat transfer medium to transfer heat to the upper material until it too is dehydrated. Naturally, this non-uniformity of heating leads to a reduction of the vitality of the culture in that the material which had been subjected to overheating is inactivated. Further, the overheating of this part of the culture produces heat decomposition products such as ammonia, hydrogen sulphide, methanol, acetic acid, and other products of pyrolysis which contact the viable portions of the culture causing such disadvantageous effects as inactivation of enzymes, changes of pH of cell contents, lysis of cell walls and the like.

Conventional freeze-drying in addition to the problem of non-uniform heating, has the disadvantage that expensive apparatus is required. Thus the dehydrator must be of heavy construction to withstand the effects of vacuum and the vacuum system must be of large capacity to continuously handle the tremendous volumes of water vapor produced at the attenuated pressure involved.

It has been proposed by Tival (U.S. Patent 1,979,124) that biological materials such as meat, glandular material, milk, etc. be dehydrated by a process which involves freezing the material and subjecting it to very high pressures while in such frozen condition to cause expression of water therefrom. The partially dehydrated material is then admixed with a solid adsorbent such as silica gel and the resulting mixture maintained under a vacuum at sub-freezing temperatures to cause transfer of moisture from the material to the adsorbent. This process has some advantages over conventional freeze-drying since the vacuum apparatus is considerably simplified in that it need only pump fixed gasses such as air whereas the water vapor is adsorbed by the silica gel and is not handled by the vacuum pump. However the procedure is not adapted to preserve the viability of microbial cultures. Thus an essential element of the Tival process is that the frozen material be subjected to very high pressures—about 2000 atmospheres (29,392 lbs. per sq. in)—to press out water. The subjection of cellular material to such extreme pressure causes its destruction by mechanical forces and by localized thermal effects within the compressed mass. Thus the very fact that such high pressures are used will cause rupture of cell walls and expulsion of protoplasmic material from the cells. In addition, even if the press is cooled, heat transfer through the solid mass will be slow and ineffective and uncontrolled so that localized heating effects will take place within the mass due to friction between mechanical parts of the press and especially due to internal friction between the particles being compressed.

Another disadvantage of the Tival process is that it is not adapted to the production of a porous, disperse product but rather one that is of a dense, compressed nature. Thus in the Tival process an essential step is subjecting the frozen material to extreme pressures. This compression naturally densifies the material by expulsion of water. Since the product of Tival is of a dense nature it is not suited for various purposes. For example, a dense product is not suitable for the production of final products of an extremely fine particle size. Thus for certain agricultural purposes it is necessary to prepare dehydrated microbial cultures in the form of a powder having a particle size of about 1 to 5 microns so that the particles can be dispersed in the form of clouds or aerosols having very low settling rates. In order to produce active (viable) dry cultures of such fine particle size it is imperative that the dry product just prior to grinding be in an expanded or dispersed condition, that is, each particle of material must consist of a porous mass in which the solid components are spread out over a considerably larger volume than they would normally occupy if placed next to one another. When such expanded particles are subjected to grinding, they can readily be transformed into particles of extremely small size, that is, on the order of 1 to 5 microns. In effect, the grinding operation does not result in a division of the individual solid components which make up the particle but causes a separation of these solid components from one another. Thus where each particle is composed of a group of bacterial cells, the individual cells being spread out over a volume considerably greater than the volume they would occupy if tightly packed together into a dense mass, the grinding operation will have the effect of simply separating one cell from another, forming a product of high viability because there is little, if any, division of individual cells. Also, the amount of energy which is required to achieve this separation of individual elements is of a low order of magnitude so that the material is not subjected to excessive mechanical stresses or thermal effects. This, in turn, means that the viability of the product is retained and the size reduction is obtained easily and efficiently. On the other hand, if the particles presented to the grinding operation are of a dense nature they will be difficult to grind and the grinding will result in a division of individual components of each particle. Thus, where the material presented to the grinding operation is in the form of particles consisting of closely packed bacterial cells, the grinding operation will result in division of individual cells with the result that the ground product will have a low viability. Also with such dense particles, the amount of energy required to accomplish the size reduction is of a high order of magnitude so that the product is exposed to excessive mechanical stresses and thermal effects. This causes loss in viability and makes the size reduction operation more difficult to accomplish.

The effect of the density of the product on the grinding operation can be further illustrated by the following description using stones in analogy to bacterial cells:

A. *Porous product.*—Stones are each coated with a thin layer of cement then deposited in a mold without applying any compressive forces, shaking, or other attempt to pack the material in the mold. The cement is allowed to harden then the product is removed from the mold. This product is found to be a mass of stones cemented together but with many gaps and interstices in it. When the mass is struck with a hammer, it is observed that the individual stones fly apart and there is little breakage of individual stones.

B. *Dense product.*—Stones are each coated with a thin layer of cement then deposited in a mold applying compression and vibration to ensure packing together of the stones in the mold. The cement is allowed to harden then the product is removed from the mold. This product is found to be a mass of stones cemented together in closely-packed relationship. When the mass is struck with a hammer, nothing happens unless considerably more force is used than with product A. If such considerable force is applied, the mass breaks and many of cleavage lines run through individual stones, that is, many of the stones are divided into pieces.

Another point to be made is that the dense products of Tival exhibit poor rehydration characteristics in that when they are contacted with water, the products will absorb the water at a slow rate. On the other hand, a porous product is especially desirable where rapid rehydration is a consideration. Porous products are admirably suited for rapid rehydration because when contacted with water the water is rapidly drawn into the crevices and interstices of the porous article.

As disclosed in our prior application, dehydration by sublimation can be carried out more efficiently and effectively by a procedure which involves directly subjecting the material to be dehydrated in a frozen state to contact with a solid adsorbent material such as silica gel. In our process the pressure treatment of Tival is eliminated with the result that the dehydrated products are obtained in a porous, disperse state and are thus in a condition admirably suited for further reduction in particle size without loss of viability and exhibit extremely high rates of rehydration. Also elimination of the compression step of Tival means that the losses in viability due to mechanical and thermal forces during compression are eliminated and the products of this invention exhibit a high degree of viability. In addition, our process is simpler than the Tival process and requires less expensive equipment since it eliminates the extreme-pressure apparatus which is an especially costly item. Other advantages of the instant process over that of Tival will be evident from the following description.

The production of dehydrated products in accordance with this invention may involve various alternative modifications. In general, the production includes a sequence of operations as outlined below:

(A) Initially there are prepared frozen particles of the material to be dehydrated. For example, microbial cells are dispersed in water and this dispersion is formed into frozen particles. In the alternative, whole microbial cultures or other moisture-containing biological materials, whether in solid or liquid state, may be formed into frozen particles.

(B) The frozen particles are then coated with a very finely divided inert material.

(C) The coated frozen particles are dehydrated by contacting them with a solid adsorbent under conditions of vacuum and temperature control, usually with refrigeration for at least the first stage of the dehydration. Under these conditions, the particles are dehydrated while retaining their original dimensions thus to produce a dried product having an extremely porous structure.

(D) The dehydrated particles and the solid adsorbent are then separated from one another by sieving or the like.

(E) The dehydrated particles are then subjected to grinding if a product of fine particle size is desired.

The steps briefly described above are explained in more detail in the following sections:

A. PREPARATION OF THE MATERIAL FOR DRYING

In the application of this process to the dehydration of a microbial culture, for example, such a culture is first produced by conventional fermentation techniques such as culturing the organism in question on a suitable liquid nutrient medium under agitated submerged conditions and under aerated or non-aerated circumstances as required by the organism. The cellular material may be dehydrated separately or together with the residual nutrient medium. Preferably the cellular material is harvested from the culture as by the use of centrifugation or the like. The centrifuge cake (the bacterial cells) is then dispersed in water using efficient agitation, homogenization or the like to get a uniform dispersion. This dispersion is then formed into frozen particles by any suitable procedure. For example, the dispersion is coated on a rotating drum having a surface maintained below the freezing temperature. The resulting frozen layer of the dispersion is then removed from the drum with a scraper blade in the form of flakes. A preferred method for producing the frozen particles involves introducing the dispersion in the form of drops onto the surface of a cold liquid medium such as methylene chloride, fluorinated hydrocarbon derivative, petroleum distillate, or other inert volatile organic solvent of low freezing point. In this way the dispersion is frozen solid while it is still in droplet form and the product is collected as a mass of pellets. This technique has the advantage that the size of the pellets may be readily controlled and the pellets have uniform size and shape. Other methods and equipment for producing frozen particles from a liquid preparation are well known in the art and can, of course, be used in place of those described.

The reason for dispersing the cellular material in water is to obtain the dehydrated product in a dispersed or attenuated form. Thus if a dispersion containing 10% solids and 90% water is frozen and then dehydrated under conditions that cause no shrinkage of the frozen particles, the final product will be of a very attenuated character, each particle being 90% air and 10% cellular material on a volumetric basis. The proportion of solids in the dispersion can be varied in accordance with the bulkiness desired in the final dehydrated product, the greater the degree of dispersion, the more attenuated (less dense) will be the dehydrated product. In many cases, the cellular material is dispersed in sufficient water to form a dispersion containing on the order of about 5 to about 20% solids.

The size of the frozen particles has an effect on dehydration procedure, particularly on the rate of dehydration and the rate at which heat is generated during the dehydration. Thus smaller particles have a greater ratio of surface to total volume so that the dehydration rate will be higher and the rate of heat generation (heat of wetting of the adsorbent minus the heat of sublimation) will be higher. Conversely, larger particles will result in a lower rate of dehydration and a lower rate of heat generation. In general, to obtain a rapid dehydration effect without causing excessive generation of heat, the size of the pieces is kept in the range from about 1/16 to about 1/4 inch.

In producing the dispersion, the bacterial cells are usually dispersed in pure water. If desired, however, the water may contain added ingredients. Where the added ingredients are nonvolatile they will of course be present in the final product; if the added ingredients are volatile they will be dissipated in the processing operation to a greater or lesser degree depending on their degree of volatility. The added ingredients may be, for example, dyes, pigments, odorants, preservative agents, or other materials which will not adversely affect the viability of the organism in question. In general such additives are used in small proportion, not to exceed about 20% of the weight of the bacterial cells.

In the production of dehydrated viable micro-organisms, fortifying salts may be added to the dispersion to assist in preserving viability as disclosed by Naylor and Smith, J. Bact., vol. 52, p. 565 (1946). For example, in the case of Serratia marcescens, to the aqueous cell dispersion one may add about ½% each of ammonium chloride, thiourea, and ascorbic acid.

B. COATING OF THE FROZEN PARTICLES

The particles of frozen moist material, however formed, are then coated with a very finely divided, inert, water-insoluble, solid material. An important consideration of the coating material is that it be in a very finely divided condition, by which is meant that the individual units of the material be one micron or less in size, preferably less than one-tenth micron. Materials in such physical condition will cohere properly to the frozen particles even when subjected to abrasive forces so as to prevent coherence between individual frozen particles. Moreover, coating materials of such physical dimensions are effective to prevent coherence between frozen particles even when employed in small proportion, that is, on the order of 0.01 to 0.1% of the weight of the frozen particles. It is naturally desirable to limit the amount of coating material as much as possible without losing its effectiveness thus to minimize the amount of coating material which eventually becomes mixed with the dehydrated product. The chemical composition of the coating material is of no consequence as long as the material has the attributes of being inert to the material to be dehydrated, water-insoluble, and solid. Preferably, the coating material should be a substance which in addition to the aforesaid characteristics has neither the ability to adsorb nor absorb water.

A preferred coating material is submicron silica. In this finely divided state, the silica has no gel structure and has no significant water sorbing properties. Other coating material which may be used are, for example, magnesium silicate, calcium silicate, calcium carbonate, aluminum oxide, aluminum silicate, aluminum phosphate, carbon, iron oxides, sulphur, tungsten, silver, gold, etc.

It is obvious that in preparing dried micro-organisms in accordance with the invention, the coating material should be non-toxic to organisms if the dried product is intended to be eventually used as a stock for proliferation of the organism. Moreover, where the end product is intended for uses involving ingestion or contact with humans or animals, the coating material should be of a non-toxic nature.

The step of coating the frozen particles prior to dehydration affords many advantages. In the absence of the coating, the frozen particles tend to adhere to one another during dehydration. Such aggregated particles lose moisture at a much slower rate than non-aggregated particles with the result that the final product exhibits a non-uniform moisture content in that the individual non-aggregated particles have lower moisture content than the aggregated particles. Moreover, particles of the solid adsorbent employed in the dehydration tend to adhere to uncoated particles of the frozen material. This results in high ash contents of the dehydrated products, that is, the dehydrated product is contaminated with adsorbent material. By employing the coating procedure herein described both of these problems are obviated in that the frozen particles of material to be dehydrated are kept separate so that uniform dehydration is achieved and coherence between these frozen particles and the particles of solid adsorbent is minimized so that the dehydrated product contains a negligible proportion of material derived from the adsorbent. A further advantage of the coating procedure of the invention is that if the frozen particles are inadvertently subjected to elevated temperatures whereby to cause surface thawing, the particles will not cohere to one another.

C. DEHYDRATION OPERATION

The coated, frozen particles of moist material are then dehydrated by contacting them with particles of a solid adsorbent such as alumina, silica gel, calcined zeolite, and so forth; silica gel being preferred. The process is carried out under vacuum and at a temperature such that the particles of moist material remain in a frozen state. Usually a temperature well below the freezing point of water is employed to prevent any liquefying from taking place. Thus the temperature is usually kept below 20° F., preferably 10° F. or less. In general the dehydration may be accomplished as follows: The particles of coated, frozen moist material and the particles of solid adsorbent are placed in a container. The container is evacuated and sealed and is then agitated to thoroughly mix the contents. The container is then kept in a room having a temperature below the freezing point of the particles of moist material and the container is continuously agitated or rolled to cause all the surfaces of the particles of moist material to come into contact with the particles of adsorbent. The system is maintained under such conditions until the dehydration is completed. It is to be noted that the container is evacuated only at the start; after that the vacuum line is simply disconnected and the container is sealed to retain the vacuum. Thus the vacuum system need only pump the air out of the container; it is not used to remove water vapor from the system.

As noted above, the dehydration is carried out at a temperature low enough to keep the material in a frozen condition. Usually it is preferred to accomplish the temperature control by keeping the container for the frozen particles and adsorbent in a refrigerator during the dehydration operation. If desired, however, the container may be provided with a jacket through which a refrigerated medium is circulated, or the container may be provided with internal coils through which a refrigerant is circulated.

In conducting the dehydration, the proportions of frozen material and solid adsorbent are so regulated that there is sufficient of the adsorbent present to adsorb from the frozen material the amount of moisture needed to be abstracted to obtain the desired degree of dehydration. Usually, to ensure rapid dehydration it is preferred to employ an excess of the adsorbent.

It is usually preferred to carry out the dehydration in several stages, for example, partially dehydrating the material in a first stage and completing the dehydration in a second stage or in several additional stages. Such technique is particularly desirable where the material is to be reduced to a very low moisture level, that is, about 1% moisture or less. In this stage-wise technique the frozen material and solid adsorbent are enclosed in a container which is then evacuated, sealed, and subjected to rolling while maintained in a refrigerated chamber as previously described. After the frozen materials are partially dehydrated, the container is opened and the partially dehydrated material is separated from the partially hydrated adsorbent. The partially dehydrated material and a fresh supply of adsorbent are placed in the container which is then evacuated, sealed and subjected to rolling to intermix the contents while maintained at a suitable temperature. The dehydration may be completed in two stages or one may apply three or more stages. One advantage of this stage-wise technique is that it permits dehydration to very low moisture levels, that is, to about 1% moisture or less. Such results cannot be obtained in a single-stage dehydration for this reason: As the dehydration proceeds, the adsorbent takes up water and develops an increasing vapor pressure which limits the extent of dehydration, that is, the dehydration process would cease when the vapor pressure of the partially dehydrated material and the vapor pressure of the adsorbent reached the same level—the system would then remain in a state of equilibrium. However, when the partially hydrated absorbent is removed and replaced with fresh adsorbent this limiting factor is eliminated and the complete dehydration can be achieved.

It has also been found in connection with the stage-wise technique of dehydration that in the later stages of dehydration, the cooling step may be often eliminated. Thus in many instances, after the material has been dehydrated to the extent that its moisture content is about 10% or less, the volume of the particles is set and their exposure to temperatures above the freezing point will no longer cause shrinkage in their volume. Thus if in the first stage of dehydration the particles are reduced to a condition of about 10% moisture or less, the second stage of dehydration may be conducted at room temperature or even at slightly elevated temperatures, for example, 70° to 90° F. with no shrinkage of volume. The advantage of using temperatures above freezing is that the final dehydration is obtained more rapidly yet without damage to the physical state of the material. In any event, the heat applied during the last stage of dehydration should be not so high as to damage the viability of the organism being dehydrated. In most cases, the temperature range cited will not adversely affect the viability at the low moisture levels existing in this stage of dehydration. It is obvious that conducting the dehydration under room temperature conditions or with moderate heating is only possible after the particles have been dehydrated to the extent that their volume and shape are set. Thus, if it takes several stages of dehydration to bring the material to this dimensionally stabilized condition than the usual cooling will be needed in all these stages but room temperature or moderate heating can be applied in the following stage or stages.

By proceeding as above described the particles of frozen moist material are dehydrated without substantial loss of viability of the organism and without shrinkage of the particles. Thus during the dehydration the particles retain their original volume, the space in each particle initially occupied by ice crystals being replaced by voids. The dehydrated particles are thus of an extremely porous, attenuated, friable structure and have a density which is but a small fraction of the density of the original frozen particles. Depending on the solids content of the original dispersion, the dehydrated particles will have density of about one-fifth to one-twentieth of the density of the original frozen particles. Because the dehydrated particles have such a porous structure they are eminently suitable for being reduced to a fine powder, that is, one in which the individual grains have about the same size as the individual bacterial cells, e.g., about 1 to 5 microns in diameter. In reducing the porous dehydrated particles into a powder, the amount of energy necessary to achieve the size reduction is of a low order of magnitude, as compared with reducing the size of dense particles. As a result, the size reduction is accomplished easily and with no substantial loss of viability.

This invention includes within its scope several novel modifications which may be applied in connection with the basic technique of adsorption sublimation dehydration described above. These alternative features are advantageous as minimizing localized heating of the frozen material or as minimizing the deleterious effects of such localized heating. These modifications are particularly useful in the dehydration of frozen particles which have a diameter of less than about 1/16 inch, in which case the rate of heat generation during dehydration is especially high. One of the novel modifications involves a plan of procedure wherein the frozen particles and the particles of adsorbent are kept unmixed, or mixed as little as possible, prior to application of vacuum. A specific mode of applying this technique involves the following steps: The frozen particles and the particles of adsorbent are placed in separate piles in the vacuum tank, the tank is evacuated, sealed under vacuum, and the materials in the tank are then mixed. The dehydration is then carried out as previously described. The advantages of such procedure are explained as follows: Where the frozen particles and particles of adsorbent are mixed under atmospheric pressure conditions, the heat liberated due to rapid adsorption of moisture by the adsorbent may cause surface melting of the particles which will result in a shrinkage of the size of the particles and a final result will be that the dehydrated particles will have increased density. On the other hand, when proceeding in accordance with this modification of the invention the frozen particles and the particles of adsorbent are in contact only under vacuum. In such an atmosphere, localized heating cannot cause melting of the surfaces of the frozen particles because liquid water does not exist at the low pressure prevailing; water can exist only as ice or water vapor. Further, because of this physical phenomenon, the heat liberated as heat of adsorption when moisture is adsorbed by the silica gel is dissipated at least in part to supply heat needed to cause sublimation of moisture from the material being dehydrated, this utilization of heat further preventing undue temperature rises. Although it is preferred to keep the frozen particles and silica gel separate until vacuum is applied, it is often difficult to actually do this because of space limitations in the vacuum tank, etc. In such case premature mixing may be prevented in whole or in part by layering the material in the tank, that is, by depositing one material on top of the other in separate layers or by inserting a temporary divider between the layers which divider is turned to one side out of the way after vacuum is applied to the tank. In any case, whether layering, mechanical separating, or the like is used, it is advisable to close the tank and apply the vacuum as rapidly as possible. After a suitable vacuum has been drawn on the tank the vacuum pump may be operated continuously. However it is generally preferred to seal the tank after the proper level of vacuum has been reached and disconnect the vacuum line. The tank can then be slowly rotated by suitable mechanical device located within a refrigerator to keep the tank and contents at below freezing temperatures. The rotation of the tank causes mixing of the particles to be dried and the silica gel.

Another novel feature in the basic adsorption sublimation dehydration operation involves initially using a silica gel adsorbent which has been partially hydrated, that is, a silica gel which contains about 10% moisture. This has the benefit that less heat is generated due to adsorption of moisture by the gel whereby the danger of reducing the viability of the product or causing it to shrink in volume is lessened. In applying this mode of operation, the frozen particles of bacterial cell dispersion are placed in a container together with particles of silica gel, the latter having a moisture content of about 10%. The tank is evacuated and sealed and agitated while kept under refrigeration to preserve the particles in the frozen state. The benefit of using a partially hydrated silica gel is explained further as follows:

The amount of heat released when silica gel is mixed with ice varies with the amount of moisture on the silica gel. Thus the amount of heat released when silica gel operates in the range of 0 to 5 percent moisture is greater than when an equal increment of moisture is added between 5 and 10 percent or 10 and 15 percent moisture. Starting a drying operation with silica gel containing 10% moisture thus provides milder drying conditions (less generation of heat) than when fully dehydrated silica gel is employed.

Another expedient which may be employed to prevent undue temperature rise during dehydration involves a stepwise addition of the adsorbent. Thus the dehydration may be carried out in the following manner: The frozen particles and an amount of adsorbent less than would be required to dehydrate the particles are enclosed in a container which is then evacuated, sealed, and subjected to rolling while in a refrigerated chamber, as previously described. After the material is partially dehydrated, the container is opened and a further amount of adsorbent is added. The container is then evacuated, sealed and subjected to rolling while in the refrigerated chamber, again as previously described. The total dehydration may involve two additions of adsorbent or as many additions as desired. The advantage of this technique is that the total heat given off by the adsorption of moisture on the silica gel is spread out over a greater period of time than where the needed amount of silica gel is applied in one batch. Since the heat is given off at a decreased rate, the danger of local overheating is minimized. Where the dehydration is conducted in a stage-wise manner, the step-wise addition of adsorbent is preferably employed during the initial stage (or stages) of dehydration necessary to bring the particles to such a moisture level that their dimensions become fixed.

D. SEPARATION OF DEHYDRATED PRODUCT AND ADSORBENT

After the dehydration is completed, the dehydrated particles and particles of adsorbent are separated from one another. This can be acomplished, for example, by a sieving operation. In some cases when the dried material and adsorbent are shaken on the sieve, the pieces of dried material because of their friable nature break up enough to pass through the sieve whereas the particles of adsorbent will remain on the sieve. Another plan which may be used is explained as follows: In conducting the dehydration, the dimensions of the frozen particles are selected to be smaller than the dimensions of the particles of solid adsorbent. When the dehydrated product is sieved the particles of adsorbent will remain on the sieve whereas the dehydrated particles will pass through the sieve. In the alternative, the material may be prepared in the form of frozen particles which are larger than the particles of adsorbent in which case the dehydrated particles will be retained on the sieve and the adsorbent will pass through. Instead of sieving, other separation techniques can be used. For example the composite product can be blown by a stream of air, preferably dry, into a pneumatic classifying device wherein the materials are separated from one another on the basis of their difference in density, the adsorbent being denser than the porous, disperse particles of the dehydrated material. Another technique is to use as the adsorbent, silica gel or the like containing a small proportion of a material having magnetic properties such as magnetite. The composite final product can then be separated into its components by the application of conventional magnetic separating devices.

E. DISINTEGRATION OF DEHYDRATED PRODUCTS

The dehydrated products, if desired in fine-particle form, may be subjected to attrition employing high-speed grinders or other known devices suitable for producing fine powders. As noted above, the dehydrated products of this invention are in a friable, porous, attenuated form so that they are capable of being reduced to fine particles with the application of moderate degrees of energy and without substantial destruction of viability because the production of the fine particles involves essentially separation of the individual cells and not cleavage of individual cells.

F. GENERAL CONSIDERATIONS

As noted above, this invention is particularly concerned with the production of dehydrated solid products from microbial preparations. The products are non-deteriorating, instantly available sources of the organism in a viable state so that the organism will proliferate vigorously immediately upon contact of the product with moist and nutritive conditions. Also the invention enables the production of such products in the form of extremely fine particles, having a particle size of about 1 to 5 microns, that is, essentially the same size as the cells of the organism. Such finely divided product is of particular usefulness in agriculture as these particles may be dispersed in the form of clouds or aerosols having very low settling rates. The application of microbial preparations in aerosol form is useful for combatting insect pests on plants and in soils and for control of plant pathogens on plants and in soils. In such applications, the microbial organism which is capable of attacking the insect or disease-producing organism in question is dehydrated and reduced to fine particles in accordance with this invention. The particles are then applied by known devices as an aerosol to the infected plants or soil. Examples of microbial organisms and the pests or diseases against which they are effective are as follows: *Bacillus popilliae* for infecting Japanese beetles with type A milky disease; *Aerobacter aerogenes* var. *acridiorum* for eradication of locusts (Schistocerca); the fungus *Beauveria bassiana* for control of the European corn borer and the codling moth; various species of the fungi *Empusa* and *Entomophthora* for the control of aphids, leaf-hoppers, flies, grasshoppers, and so forth; cultures of the streptomycin-producing organism *Actinomyces griseus* for the control of halo blight (*Pseudomonas medicaginis* var. *phaseolicola*) and common blight (*Xanthomonas phaseoli*) on beans. It is obvious that other bacterial, fungal, antibiotic preparations and so forth may be reduced to dry, fine particle form in accordance with this application. The process of the invention is also useful for drying bacterial cells for use in biological assays.

Although this invention is particularly adapted to the dehydration of microbial cultures, it can be applied to any kind of biological material. Thus one may utilize the invention for the dehydration of foods such as fruits, vegetables, meat, fish, eggs, milk, soups, fruit juices, and so forth. Also the process of the invention may be utilized for the dehydration of protein solutions, therapeutic biological preparations, antibiotics, glandular preparations, sera, enzymes, yeast, vitamin concentrates, etc. In all such cases, the use of the dehydration process of this invention has the advantage that the removal of moisture is accomplished without damage to the essential components and characteristics of the original material. For example, in the case of foods, such essential attributes as flavor and vitamin content are retained; in the case of proteins, enzymes, therapeutic products, antibiotics, vitamin concentrates, etc., such essential attributes as chemical identity, enzyme activity, nutritive value, etc. are retained. In short, the dehydration is attained without deterioration of the labile constituents of the original material. In applying the dehydration to solid materials such as meat, fruits, vegetables, etc. the material may be cut up into small particles, then frozen, coated and dehydrated as described above. If it is desired to make final product of a more porous and disperse character then the solid material may be comminuted to form a pulp or slurry which is then dispersed in water, the dispersion being formed into frozen particles, coated, and dehydrated as described. Obviously by increasing the degree of dispersing (using more water per part of starting material) the product will be of a lighter and more disperse character. Where the starting material is a liquid such as an animal or plant serum the liquid may be frozen directly and formed into particles for application to the dehydration operation or it may be admixed with water before freezing to get a final product of less dense nature.

The invention is further demonstrated by the following examples.

*Example 1*

A culture of *Serratia marcescens* was prepared, the bacterial cells being then separated by centrifugation and washed with water. The cells were then agitated with water to produce a dispersion of the bacterial cells, the dispersion containing 10% solids.

The dispersion was caused to fall while in droplet form into a bath containing a mixture of trichloro-monofluoromethane and trichlorotrifluoroethane, maintained at minus 50° C. The pellets of frozen aqueous bacterial dispersion, having a diameter of one-eighth inch, were separated from the bath and allowed to stand at minus 18° C. to permit vaporization of fluorinated hydrocarbons from the pellets.

Four 100-gram batches of the frozen pellets at 0° F. were placed in individual screw-cap containers. Two of the batches were treated with 0.05% by weight of submicron silica (not in gel form). The treatment involved adding 0.05 gram portions of the submicron silica to each of two of the containers and shaking for a few seconds. The remaining two samples of frozen pellets were not coated thus to provide a control.

Each of the four batches of frozen pellets were dehydrated as follows—

One hundred grams of the pellets and 400 grams of 10 to 14 mesh silica gel (at 0° F.) were placed in a cylindrical metal container equipped with a sealable lid carrying a conduit and valve arrangement. The container was closed and exhausted to 1 mm. Hg through the conduit. The source of vacuum was then disconnected and the valve closed to thus seal the container. After shaking of the container to thoroughly mix the contents, it was placed on a roller device whereby the container was rotated about its axis at a speed of about 0.5 r.p.m. This mixing by slow rotation was continued for 4 hours at 0° F.

At the end of this time the four containers were opened and the dehydrated products separated from silica gel by screening. It was observed that the pellets of bacterial dispersion had retained their original spherical shape. However, the product which had not been coated showed some clusters formed by coherence of individual pellets during dehydration. In the product wherein the pellets had been coated there were no clusters present. Observation of the products under a low-power microscope disclosed small pieces of silica gel stuck to the pellets and the clustered pellets of the uncoated product. The coated pellets exhibited little if any of the silica gel on the pellets.

Ashing procedures conducted on the dried pellets gave there results—

| Product: | Silica content, percent |
|---|---|
| Coated | 0.15 |
| Uncoated | 0.45 |

Example II

A culture of *Leuconostoc mesenteroides* was prepared and centrifuged to separate the cellular material. This material was agitated in sufficient water to form a dispersion of 11% solids and the dispersion was neutralized to pH 7.0 with 1% KOH solution.

The bacterial dispersion was formed into frozen pellets in the same manner as described in Example I.

Two 100-gram samples of the frozen pellets at 0° F. were weighed into separate screw-cap bottles. One batch of pellets was coated by shaking with 0.05% of submicron silica (not in gel state). The other batch of pellets was left uncoated to provide a control.

The coated and uncoated frozen pellets were dehydrated exactly as described in Example I.

After drying and separating the silica gel and pellets, the presence of clumps was observed in the uncoated product. Screen separations showed that 12% of the pellets present in the uncoated sample were clustered in clumps of 3 or more pellets. No clumping was observed with the coated sample.

Example III

A culture of *Serratia marcescens* was prepared, the bacterial cells being then separated by centrifugation and washed with water. The cells were then agitated with water to produce a dispersion of the bacterial cells, the dispersion containing 19% solids.

The dispersion was caused to fall while in droplet form into a bath containing a mixture of trichloro-monofluoromethane and trichlorotrifluoroethane, maintained at minus 50° C. The pellets of frozen aqueous bacterial dispersion, having a diameter of one-eighth inch, were separated from the bath and allowed to stand at minus 18° C. to permit vaporization of fluorinated hydrocarbon from the pellets.

The frozen pellets were coated by shaking them for a few seconds with 0.05% of their weight of submicron silica (not in gel state).

One hundred grams of the coated pellets and 400 grams of 6 to 12 mesh silica gel were placed in a cylindrical metal container equipped with a sealable lid carrying a conduit and valve arrangement. The container was closed and exhausted to 1 mm. Hg through the conduit. The source of vacuum was then disconnected and the valve closed to thus seal the container. After shaking of the container to thoroughly mix the contents, it was placed on a roller device whereby the container was rotated about its axis at a speed of about 0.5 r.p.m. This mixing by slow rotation was continued for 4 hours at 0° F.

At the end of this time the container was opened. It was observed that the pellets of bacterial dispersion retained their original size. By this operation the density of the pellets was reduced from 1 gram per cc. to about 0.1 gram per cc. There was no evidence of clumping of individual pellets. The contents of the container was placed on a 35-mesh sieve and subjected to shaking to break up the pellets. The pellet material passed through the sieve leaving the silica gel particles on the sieve. The pellet material, that is, the bacterial preparation, had a moisture content of 10%.

The material of 10% moisture content from the preceding step was subjected to a second drying in the same general manner as in the first stage. Thus the material was placed in the container with 5 times its weight of silica gel. The container was evacuated and subjected to a slow rolling action for 3 hours at 70° F. The container was then opened and the product screened through a 65-mesh sieve. In this case the sieving operation was conducted in a chamber containing air at low humidity to prevent uptake of moisture by the dried material. The dried bacterial powder passing through the sieve had a moisture content of 1% and a viability of 68%. A sample of this product ground in a high-speed grinder yielded a product with a mass mean diameter of 4.2 microns as determined by sedimentation.

Having thus described our invention, we claim:

1. In a process for dehydrating an organic material wherein frozen particles of water-containing organic material are contacted with a solid adsorbent while maintained under vacuum and at a temperature regulated to keep the particles in a solid state during the dehydration, the improvement which comprises coating the particles with a very finely-divided, inert, water-insoluble, solid material prior to contacting the particles with the solid adsorbent whereby to inhibit coherence of the particles with one another and with the solid adsorbent.

2. The process of claim 1 wherein the solid material is silica in a submicron state of subdivision.

3. The process of claim 1 wherein the organic material is microbial cells and the solid material is silica in a submicron state of subdivsion.

4. A process for dehydrating a biological material which comprises: forming a water-containing biological material into frozen particles; coating the frozen particles with a very finely-divided, inert, water-insoluble, solid material; subjecting the coated, frozen particles having their original moisture content and original volume to dehydration by contacting them with a solid adsorbent under vacuum and at a temperature at which the particles remain in a solid state, the temperature being at a sub-freezing level for at least the first part of the dehydration; and separating the dehydrated particles from the adsorbent.

5. The process of claim 4 wherein the solid material is silica in a submicron state of subdivision.

6. The process of claim 4 wherein the biological material is microbial cells and the solid material is silica in a submicron state of subdivision.

References Cited in the file of this patent

UNITED STATES PATENTS

| 2,446,075 | Blair | July 27, 1948 |
|---|---|---|
| 2,723,954 | Young | Nov. 15, 1955 |
| 2,853,797 | Graham et al. | Sept. 30, 1958 |